(12) United States Patent
O'Neill et al.

(10) Patent No.: US 11,306,427 B2
(45) Date of Patent: Apr. 19, 2022

(54) DRAIN BOX AND FUNNEL

(71) Applicant: Accor Technology, Inc., Kirkland, WA (US)

(72) Inventors: Jerry Edward O'Neill, Kirkland, WA (US); Charlie E. Whitney, Wast Wenatchee, WA (US)

(73) Assignee: Accor Technologies, Inc., Kirkland, WA (US)

( * ) Notice: Subject to any disclaimer, the term of this patent is extended or adjusted under 35 U.S.C. 154(b) by 127 days.

(21) Appl. No.: 16/926,222

(22) Filed: Jul. 10, 2020

(65) Prior Publication Data

US 2021/0010182 A1 Jan. 14, 2021

Related U.S. Application Data

(60) Provisional application No. 62/872,631, filed on Jul. 10, 2019.

(51) Int. Cl.

| *D06F 39/08* | (2006.01) |
|---|---|
| *D06F 39/00* | (2020.01) |
| *C02F 5/08* | (2006.01) |
| *A47L 15/42* | (2006.01) |
| *E03C 1/122* | (2006.01) |
| *E03C 1/184* | (2006.01) |

(52) U.S. Cl.
CPC .............. *D06F 39/083* (2013.01); *C02F 5/08* (2013.01); *D06F 39/007* (2013.01); *D06F 39/08* (2013.01); *A47L 15/4229* (2013.01); *E03C 1/1222* (2013.01); *E03C 1/184* (2013.01)

(58) Field of Classification Search
CPC ...... D06F 39/007; D06F 39/08; D06F 39/083; A47L 15/4229; C02F 5/08; E03C 1/1222; E03C 1/184
See application file for complete search history.

(56) References Cited

U.S. PATENT DOCUMENTS

| 2,952,271 | A | * | 9/1960 | Dick | E03C 1/021 137/360 |
|---|---|---|---|---|---|
| 4,158,471 | A | * | 6/1979 | Logsdon | D06F 39/083 312/229 |
| 4,410,004 | A | * | 10/1983 | Kifer | E03C 1/184 137/360 |
| 6,125,881 | A | * | 10/2000 | Hobbs | D06F 39/08 137/360 |
| 6,148,850 | A | * | 11/2000 | Kopp | F16L 5/14 137/360 |

(Continued)

*Primary Examiner* — Joseph L. Perrin
(74) *Attorney, Agent, or Firm* — George C. Rondeau, Jr.; Davis Wright Tremaine, LLP

(57) ABSTRACT

A drain box having a housing, a splash containment therein with a lower portion within a housing drain aperture, and a discharge conduit having a lower portion positioned within the splash containment in position above the drain aperture and extending upward through splash containment aperture, and an upper portion extending upward through a housing upper aperture and terminating above the housing upper portion for connection to an appliance discharge conduit. The conduit being attached to the housing to prevent a lower discharge conduit end from moving downward toward the drain aperture to less than a predetermined minimum distance above the housing drain aperture.

37 Claims, 8 Drawing Sheets

(56) References Cited

U.S. PATENT DOCUMENTS

| | | | | |
|---|---|---|---|---|
| 6,155,286 | A * | 12/2000 | Geary | E03C 1/021 |
| | | | | 137/360 |
| 8,020,581 | B1 * | 9/2011 | Julian | E03C 1/184 |
| | | | | 137/360 |
| 10,385,554 | B2 * | 8/2019 | O'Neill | E03B 7/095 |
| 10,865,550 | B1 * | 12/2020 | Sampson | E03C 1/021 |
| 2015/0197924 | A1 * | 7/2015 | Whitehead | D06F 39/08 |
| | | | | 220/3.3 |
| 2015/0225930 | A1 * | 8/2015 | Whitehead | D06F 39/08 |
| | | | | 137/360 |
| 2016/0108608 | A1 * | 4/2016 | Williams | E03C 1/021 |
| | | | | 137/15.08 |

* cited by examiner

DRAIN BOX AND FUNNEL

CROSS REFERENCE TO RELATED APPLICATION

This application claims the benefit of U.S. Provisional Application No. 62/872,631, filed on Jul. 10, 2019, which is incorporated herein by reference in its entirety.

BACKGROUND OF THE INVENTION

Field of the Invention

The invention relates to outlet boxes, and more particularly, to outlet boxes used for draining the discharge of water softeners and other apparatus, which discharge water into a drain.

Description of the Related Art

Water softeners have a cleaning cycle where they have to discharge collected sediment into a drain. The discharge has to be piped to a drain location. The discharge pipe cannot protrude into the drain as it could siphon dirty water back into the potable water system during the water softener cycling process. This can occur during a backed up drain situation. As such, the discharge pipe has to be suspended above the drain in accordance to IAPMO PS-65. The same is basically true for drains to which portable dishwashers, furnaces and HVAC units are attached.

When the tank of a water softener is drained, the discharge of the brink water typically occurs rapidly at a high flow rates, such as six gallons per minute. If the discharge is into a conventional utility drain box, particularly if in the same area of a home where a washing machine drain box is located, the discharge water can cause water damage to the home if the drain tube disconnects from the drain box under the force of the discharge water, or the discharge pipe to which the drain tube is connected is not in good alignment with drain hole in the drain box, resulting in splashing or worse.

BRIEF DESCRIPTION OF THE SEVERAL VIEWS OF THE DRAWING(S)

Various embodiments in accordance with the present disclosure will be described with reference to the following drawings.

Like reference numerals have been used in the figures to identify like components.

DETAILED DESCRIPTION OF THE INVENTION

Figure 1:
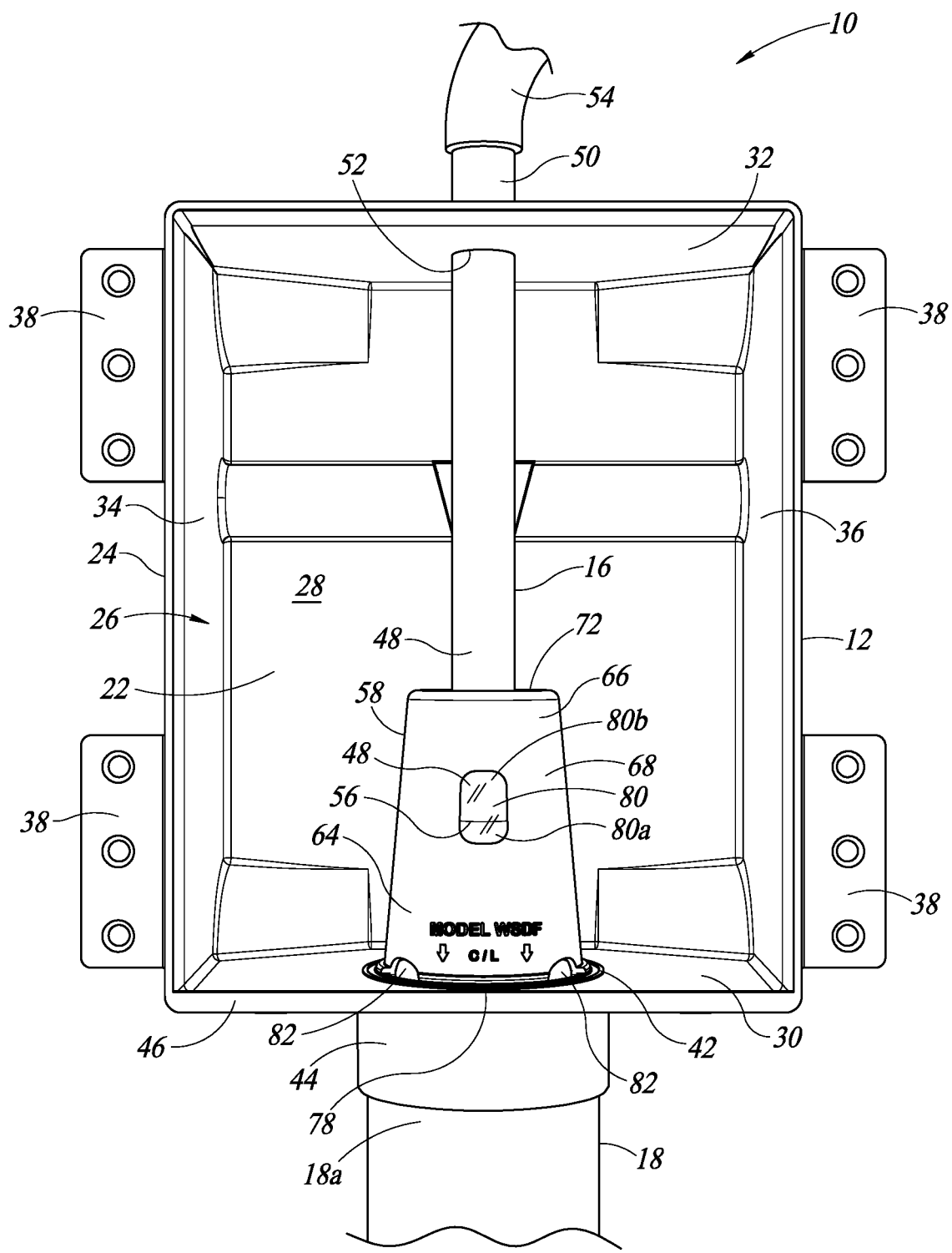
FIG. 1 is a front elevational, perspective view of an assembled drain housing and funnel according to a first embodiment.
Figure 2:
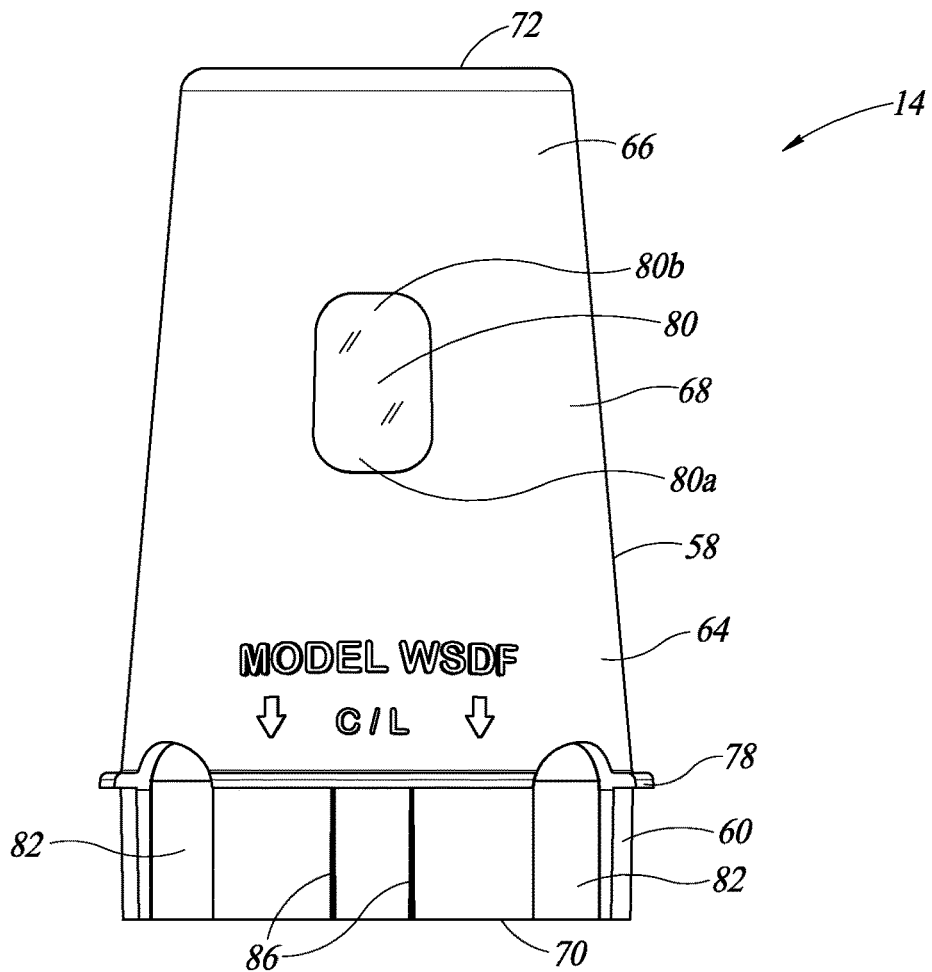
FIG. 2 is an enlarged front elevational view of the funnel of FIG. 1 removed from the housing.
Figure 3:
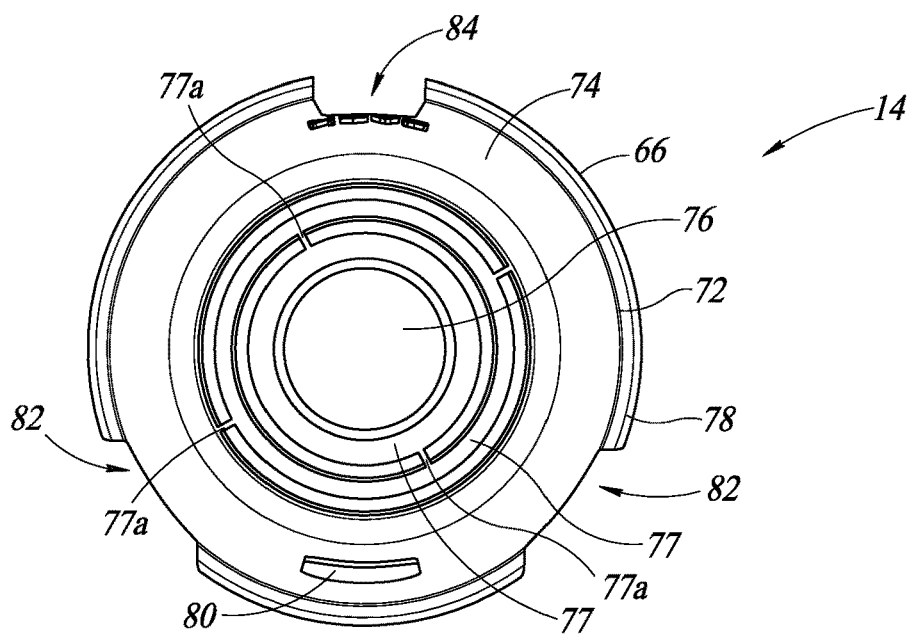
FIG. 3 is a top plan view of the funnel of FIG. 2.
Figure 4:
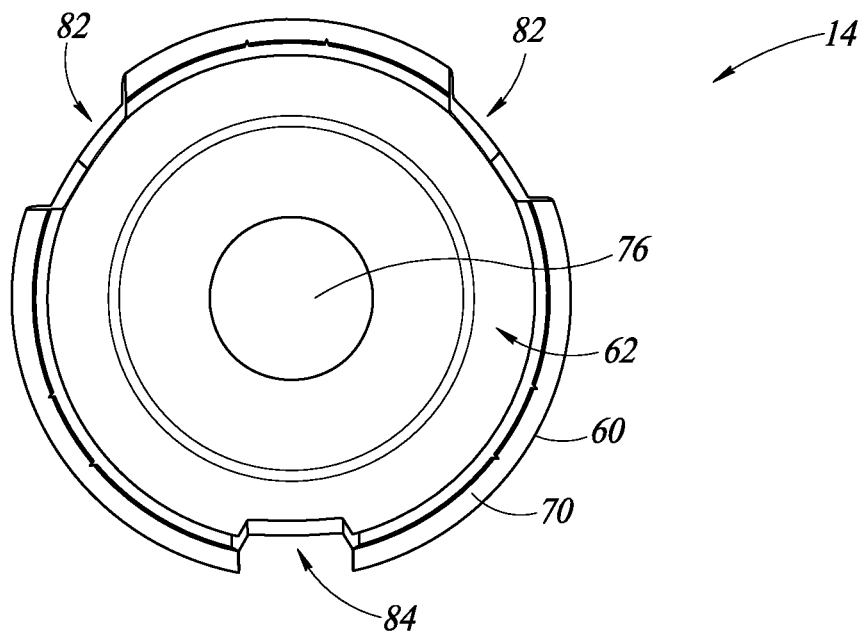
FIG. 4 is a bottom plan view of the funnel of FIG. 2.
Figure 5:
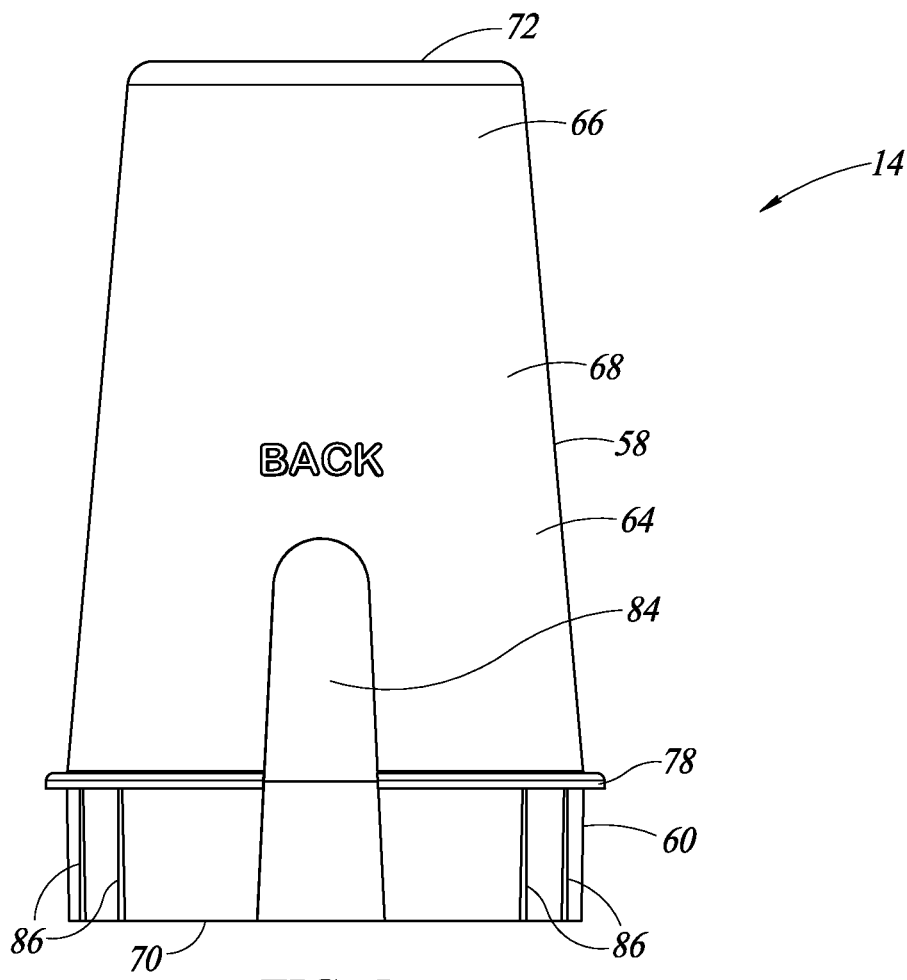
FIG. 5 is a rear elevational view of the funnel of FIG. 2.
Figure 6:
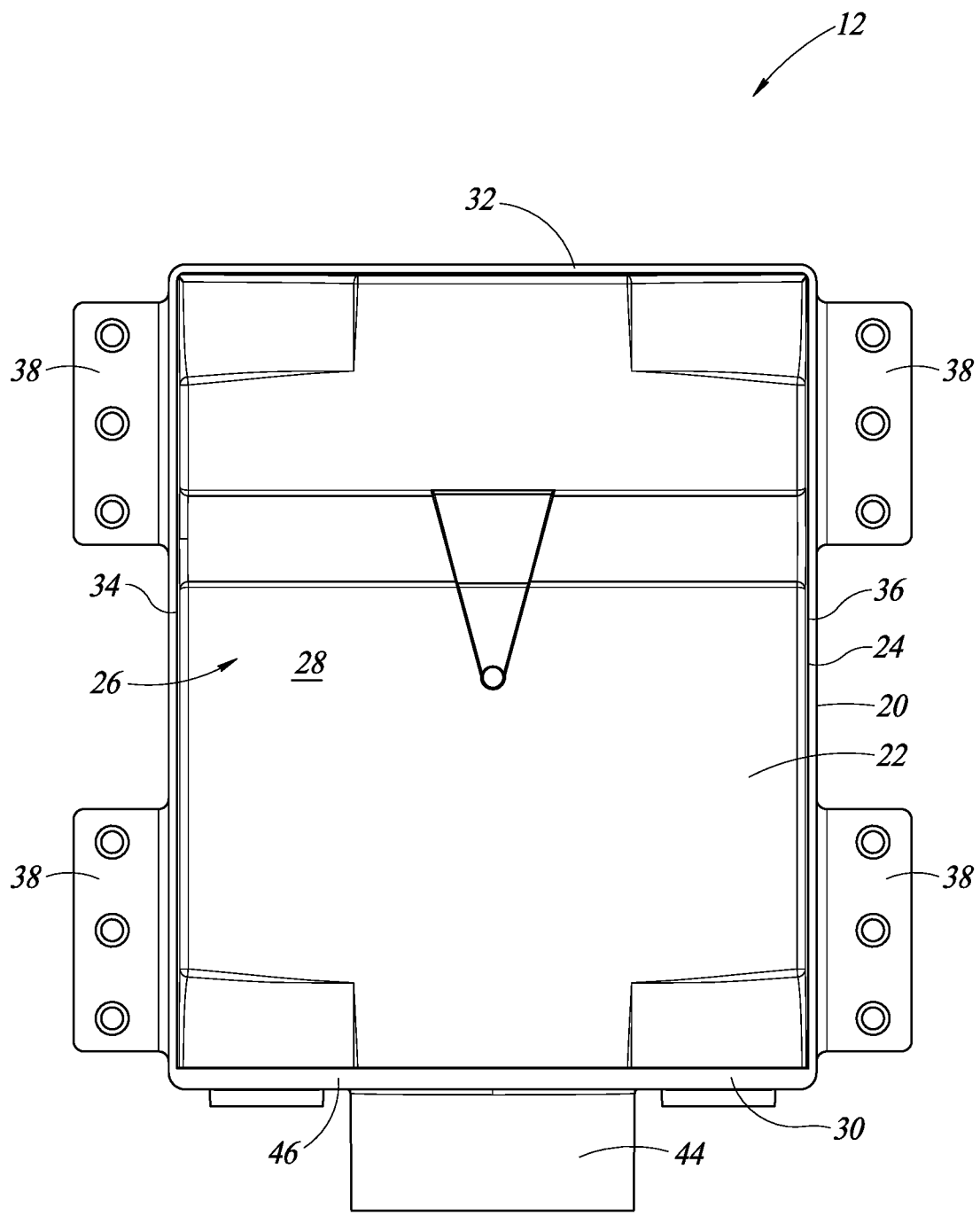
FIG. 6 is a front elevational view of the housing of FIG. 1 with the funnel and other components removed.
Figure 7:
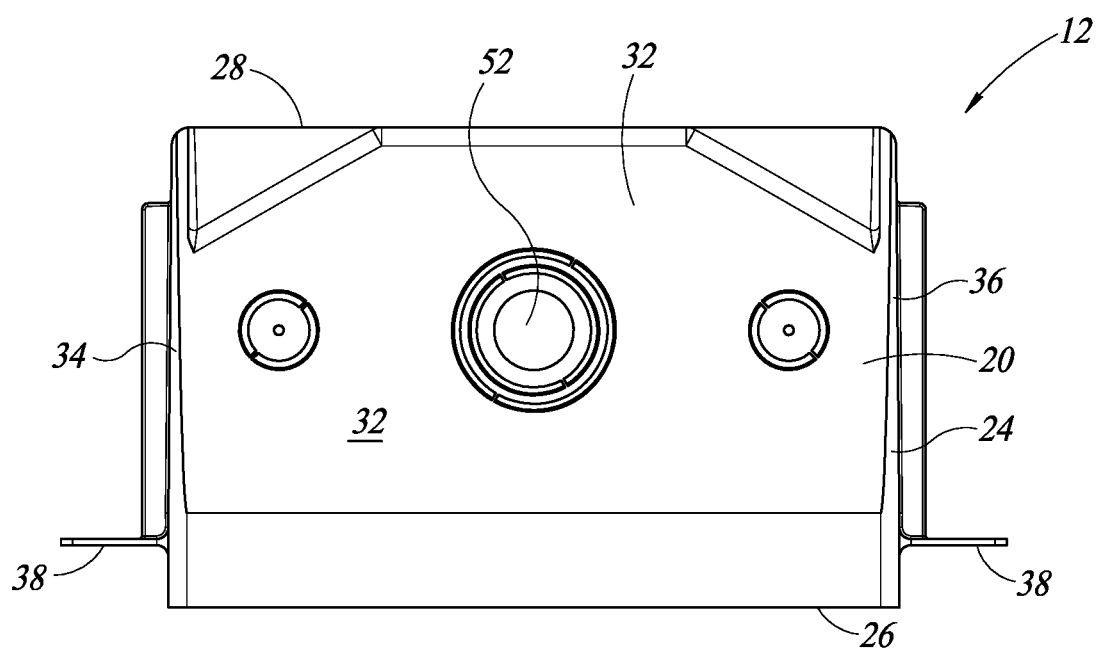
FIG. 7 is a top plan view of the housing of FIG. 6.
Figure 8:
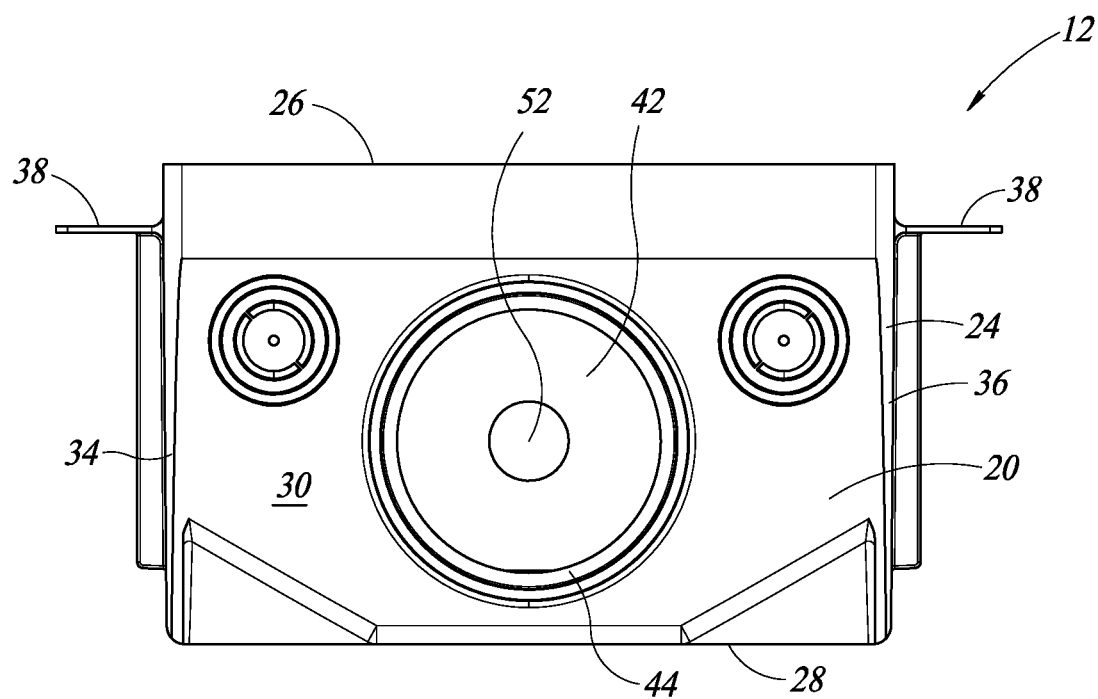
FIG. 8 is a bottom plan view of the housing of FIG. 6.
Figure 9:
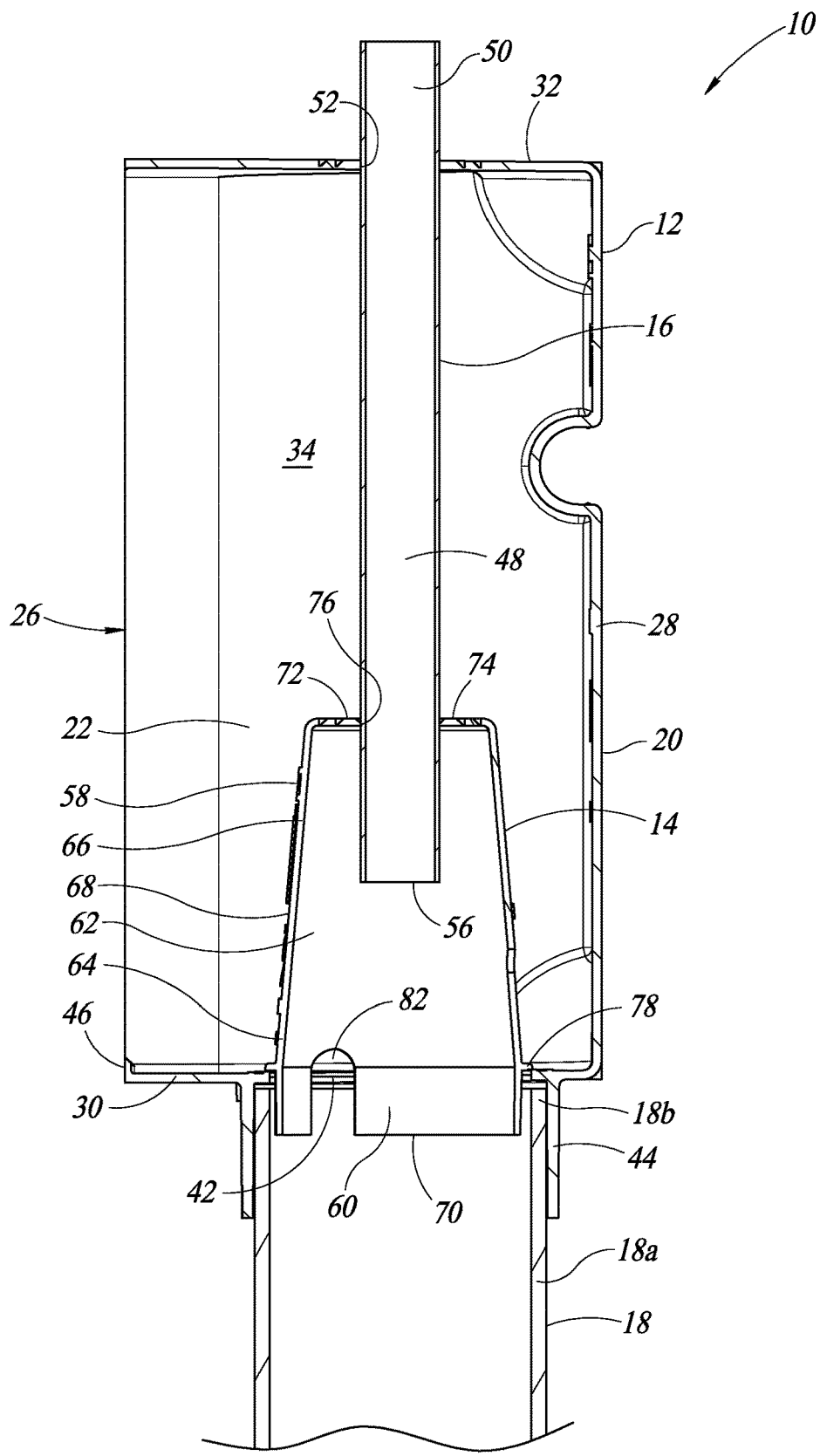
FIG. 9 is a right side elevational view of the assembled drain housing and funnel of FIG. 1.
Figure 10:
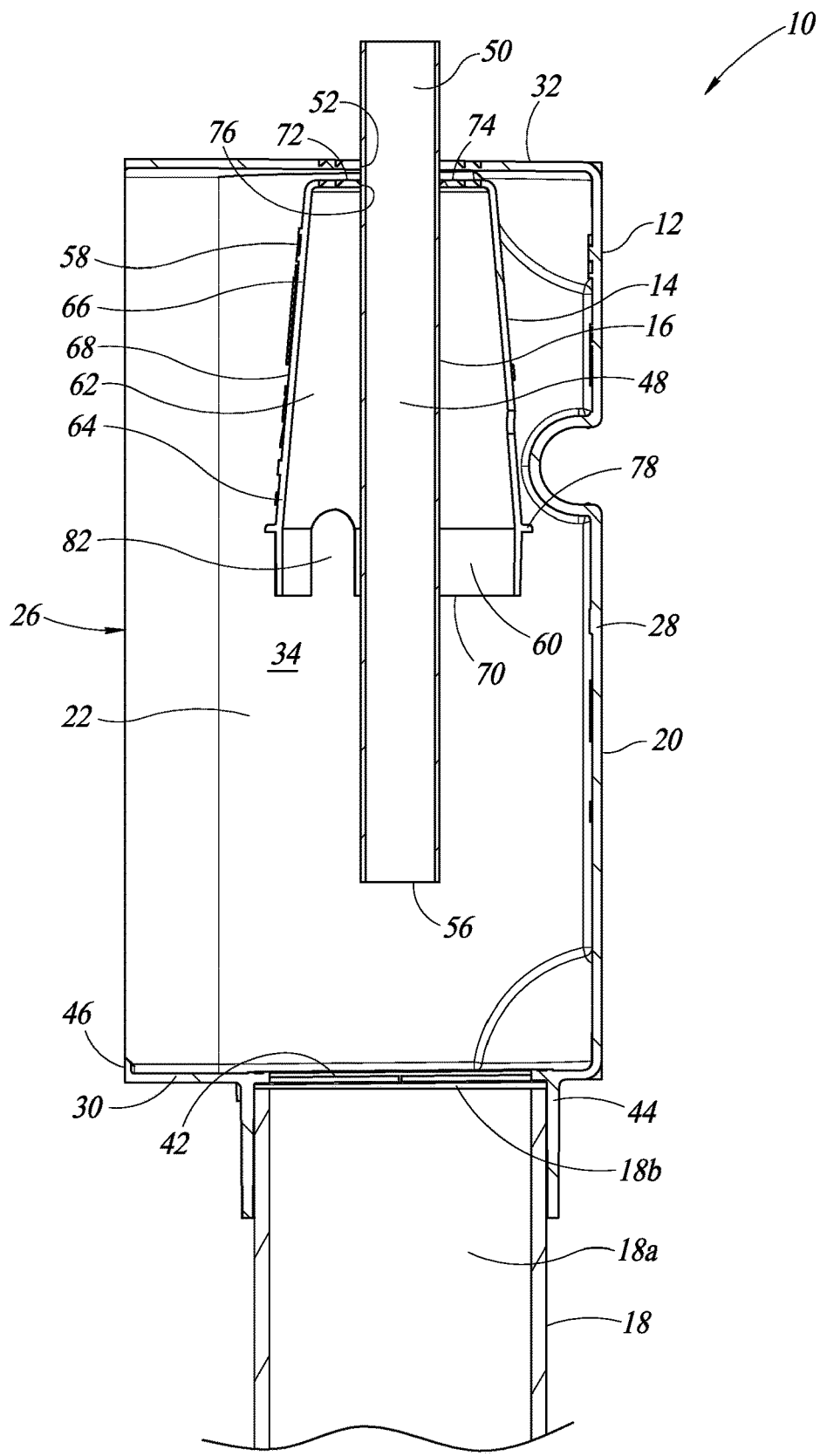
FIG. 10 is a right side elevational view of the assembled drain housing and funnel of FIG. 1 with the funnel shown in a raised position.
Figure 11:
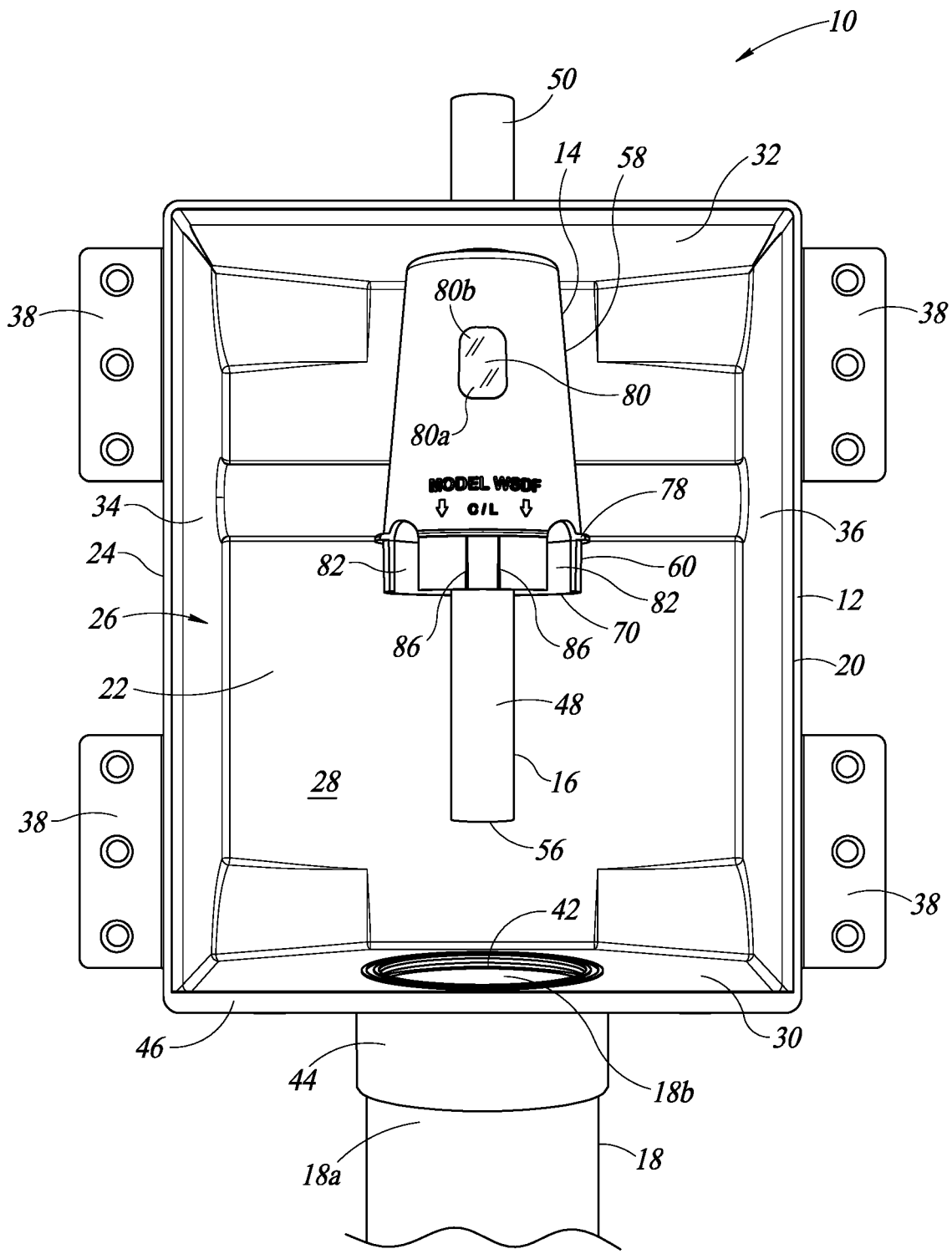
FIG. 11 is a front elevational, perspective view of the assembled drain housing and funnel of FIG. 10 where the funnel is shown in a raised position.

A drain box and funnel assembly 10 according to a first embodiment is shown in FIG. 1, and includes a drain box 12, a splash containment or funnel 14 and a discharge conduit or pipe 16. The drain box 12 is configured to be installed in the wall of a residential or commercial building to provide access and to a drain, typically a drain pipe 18 located at or within a wall which serves as a disposal point for discharge water from an appliance, such as a water softener.

The drain box 12 may be comprised of a rigid waterproof material, such as plastics, polymers, or polyvinyl chloride (PVC); however, other similar materials are contemplated. In this first embodiment, the drain box 12 is configured to provide a discharge water disposal point for appliances, such as a water softener; however, those of ordinary skill in the art will recognize that the configuration of the drain box may be suitable for other applications, such as a washing machine, dishwasher, icemaker, furnace or HVAC unit.

The drain box 12 includes a box housing 20 having a generally three-dimensional square or rectangular outer shape. A forwardly opening cavity portion 22 is defined by housing walls 24 extending rearwardly from a front opening 26 and terminating at a rear wall 28. The housing walls 24 are comprised of a lower wall 30, an upper wall 32 opposite to the lower wall, and opposing left and right side walls 34 and 36, respectively. Attachment flanges 38 projecting laterally from the forward portions of the left and right side walls 34 and 36 provide means for securing the drain box 12 at an opening within a wall of a residential or commercial building.

The lower wall 30 has a circular drain hole 42 which communicates with a receptacle 44 extending downward from the lower wall. Discharge water accumulating in a lower portion of the cavity portion 22 of the box housing 20 during use of the drain box and funnel assembly 10 will exit the cavity portion through the drain hole 42. The receptacle 44 has a cylindrical collar shape is disposed below the lower wall 30 and extends about the drain hole 42. The receptacle 44 is in fluid-tight engagement with the lower wall 30. The receptacle 44 is sized to receive therein an upper end portion 18a of the drain pipe 18, and when the drain box and funnel assembly 10 is fully installed, the drain pipe 18 is in fluid-tight engagement with the receptacle 44.

The drain box 12 includes a front lip 46, which extends fully across the front opening 26 and projects upward from the lower wall 30 to define a collection pan. The front lip 46 is in fluid-tight engagement with the lower wall 30, and the left and right side walls 34 and 36. As such, any splash water within the drain box 12 that may accumulate within the drain box, so long as at a level below the upper end of the front lip 46, is prevented from flowing forward out the front opening 26 and instead will flow downward through the drain hole 42 in the lower wall 30 and into the drain pipe 18.

The discharge pipe 16 is positioned with a lower end portion 48 extending vertically within the drain box 12 and an upper end portion 50 projecting through an aperture 52 in the upper wall 32. The upper end portion 50 extends sufficiently above the upper wall 32 to permit connect thereto of a tube, hose or other conduit 54 of the water softener or other appliance that conducts the water to be discharged.

The lower end portion 48 of the discharge pipe 16 is in vertical alignment with the drain hole 42 in the lower wall 30. The upper end portion 50 of the discharge pipe 16 extends through and is securely attached to the upper wall 32 such that a lower end 56 of the lower end portion 48 of the discharge pipe 16 is locked in position at a selected height directly above the drain hole 42 in the lower wall 30, and hence at a selected proper height above an upper open end 18*b* of the upper end portion 18*a* of the drain pipe 18 when the drain box and funnel assembly 10 is fully installed. The proper height of the lower end 56 of the lower end portion 48 of the discharge pipe 16 above the upper open end 18*b* of the upper end portion 18*a* of the drain pipe 18 is typically determine by building codes (often one inch or more) so as to provide an adequate air gap to prevent siphoning the discharge water back into the discharge pipe 16 and then the portable water system, e.g., during a water softener cycling process.

The funnel 14 has an upper funnel side wall 58 with a generally frustoconical shape and a lower funnel side wall 60 with a cylindrical shape, although other shapes may be used. The upper and lower funnel side walls 58 and 60 define a funnel interior cavity 62. The upper funnel side wall 58 has a lower end side wall portion 64, an upper end side wall portion 66, and a middle side wall portion 68 positioned between the lower end side wall and upper end side wall portions. The upper funnel side wall 58 progressively tapers inward in the upward direction. A lower end 70 of the lower funnel side wall portion 60 is open, and an upper end 72 of the upper end side wall portion 66 is closed by an upper end wall 74. The upper end wall 74 has an aperture 76 sized to receive the lower end portion 48 of the discharge pipe 16 therethrough and to permit the funnel 14 to be freely moved up and down within the drain box 12 on the lower end portion of the discharge pipe during installation of the drain box and funnel assembly 10. In a preferred embodiment, the upper end wall 74 has a plurality of knockout portions 77 which can be selected to set the size of the aperture 76. The knockout portions are at least partially joined or connected by narrow bridge portions 77*a* extending radially inward to the knockout portions. The bridge portions 77*a* may be broken to remove the undesired knockout portions 77 to create the aperture 76 of the desired size need for the size discharge pipe 16 to pass through the aperture.

The lower funnel side wall 60 is sized to fit within the drain hole 42 in the lower wall 30 and to extend downward into the drain pipe 18. The funnel 14 has a flange 78 projecting outward from an outward surface of the funnel that extends about the perimeter of the funnel at the junction of the upper funnel side wall 58 and the lower funnel side wall 60. The flange 78 contacts the lower wall 30 when the lower funnel side wall 60 is fully inserted in the drain hole 42 and limits further downward movement of the funnel in the drain hole.

The middle side wall portion 68 of the funnel 14 has an air gap viewing window 80, and the lower end side wall portion 64 of the funnel has two drain openings 82 that in the illustrated embodiment extend downward fully through the lower funnel side wall 60. In the illustrated embodiment, the funnel 14 is made of a clear polymer or plastic, such as ABS, with the area of the air gap viewing window 80 being polished sufficiently to be transparent and provided clear visibility of the discharge pipe 16 within the funnel and with the remaining portions of the funnel frosted and at least partially obscures the view therethrough. As will be described below, this allows an inspector to see the installation air gap spacing within the funnel 14. The air gap viewing window 80 has a lower end 80*a* and an upper end 80*b*. In the illustrated embodiment, the lower end 80*a* extends along a substantially straight line over at least a portion of its length that serves as a marker of the minimum air gap required by the applicable building code, i.e., the farthest down the lower end portion 48 of the discharge pipe 16 can extend and still be within the air gap requirement of the applicable building code. When the drain box and funnel assembly 10 is installed, if a person looking level through the air gap viewing window 80 sees the lower end 56 of the lower end portion 48 of the discharge pipe 16 anywhere in the window, i.e., above the lower end 80*a*, an acceptable air gap exists. However, if the lower end portion 48 of the discharge pipe 16 extends downward past the lower end 80*a* of the air gap viewing window 80, the minimum air gap requirement has not been satisfied. While the air gap viewing 80 allows an installer and inspector to confirm that the air gap spacing within the funnel 14 is according to code, since the discharge pipe 16 is preferably installed in the drain box and securely attached to the upper wall 32 at the manufacturing factory with the lower end portion 48 of the discharge pipe at or above the predetermined minimum distance above the drain hole 42, the air gap spacing needs no adjustment as part of the installation process and will not change during installation.

The two drain openings 82 in the lower end side wall portion 64 of the funnel 14 are sized extend upward sufficiently above the upper surface of the lower wall 30 of the drain box 12 when the funnel is installed in the drain box and funnel assembly 10, to allow any discharge water accumulating in a lower portion of the cavity portion 22 of the box housing 20 outside of the funnel 14 during use of the drain box and funnel assembly, such as any splash collected within the drain box, to flow through the drain openings into the funnel and then into the drain pipe 18.

The funnel 14 includes a vertically extending anti-siphon slot 84 in the upper funnel side wall 58, on a rearward facing side of the funnel, with an upper end portion of the slot in the middle side wall portion 68 of the upper funnel side wall 58, preferably at or above the lower end 56 of the lower end portion 48 of the discharge pipe 16. The slot 84 extends downward through and beyond the lower end side wall portion 64, and fully through the lower funnel side wall 60. The slot 84 permits discharge water which might otherwise build up within the funnel interior cavity 62 during use of the drain box and funnel assembly 10, to flow outward into the larger cavity portion 22 of the box housing 20 and not submerge the lower end 56 of the lower end portion 48 of the discharge pipe 16 and be siphoned back into the discharge pipe. The discharge water in the cavity portion 22 of the box housing 20 will then exit the cavity portion through the two drain openings 82 in the funnel 14 and flow into the drain hole 42 in the lower wall 30 and then into the drain pipe 18.

Installation of the drain box and funnel assembly 10 typically begins with positioning of the drain box 12 within the wall and gluing the upper end portion 18*a* of the drain pipe 18 within the receptacle 44 of the drain box 12 and, typically, nailing the drain box in place using the attachment flanges 38. Next, the tube, hose or other conduit 54 of the water softener or other appliance that conducts the discharge water to the drain box and funnel assembly 10 is securely connected to the upper end portion 50 of the discharge pipe 16 that projects above the upper wall 32 of the drain box 12. A leak test in then conducted before a knockout (not shown)

positioned within the drain hole 42 is removed (i.e., while the drain hole is sealed by the knockout) to confirm the drain box 12 does not leak.

Upon passing the leak test, the knockout is removed, thus opening the drain hole 42 in the lower wall 30. This provides a path for any discharge water accumulating in the lower portion of the cavity portion 22 of the box housing 20 during use of the drain box and funnel assembly 10 to exit the cavity portion through the two drain openings 82 in the funnel 14 and the drain hole 42 in the lower wall 30, and then flow into the drain pipe 18. The lower funnel side wall 60 is then inserted into the drain hole and press downward so as to extend downward into the upper end portion 18a of the drain pipe 18 until the flange 78 engages the upper surface of the lower wall 30, with the air gap viewing window 80 of the funnel 14 facing toward the front opening 26 of the drain box 12.

To facilitate insertion of the lower funnel side wall 60 into the drain hole 42 and ultimately into the upper end portion 18a of the drain pipe 18, and it retention therein, the lower funnel side wall 60 includes three pairs of vertically oriented and outwardly projecting crush ribs 86, with the pairs being circumferentially arranged around the lower funnel side wall. As the lower funnel side wall 60 is inserted into the drain hole 42 in the lower wall 30 and then into the upper end portion 18a of the drain pipe 18, the crush ribs 86 may flex inward and provide a snug fit of the lower funnel side wall therein. Once inserted, the crush ribs 86 provide a snug fit sufficient to eliminate the need to glue the lower funnel side wall 60 funnel in place for use of the drain box and funnel assembly 10.

The air gap viewing window 80 permits the installer and ultimately a building inspector to visually determine the size of the air gap through the air gap viewing window 80 (i.e., the distance between the lower end 56 of the lower end portion 48 of the discharge pipe 16 above the upper open end 18b of the upper end portion 18a of the drain pipe 18), and that the air gap meets the building code.

A final inspection is then performed to verify that the lower end portion 48 of the discharge pipe 16 is not protruding into the drain pipe 18 and that the lower end 56 of the lower end portion 48 is at the proper height above the upper open end 18b of the upper end portion 18a of the drain pipe 18 i.e., the air gap required by the building code or otherwise has been achieved. The funnel 14 may then be glued in place if desired.

The snug fit of the lower funnel side wall 60 within the drain hole 42 in the lower wall 30 of the drain box 12 and the drain pipe 18, and the upper end portion 50 of the discharge pipe 18 extending through the aperture 52 in the upper wall 32 of the drain box and the lower end portion 48 thereof in the aperture 76 in the upper end wall 74 of the funnel, securely hold the discharge pipe in vertical alignment with the drain hole 42 during use of the drain box and funnel assembly 10.

It is noted that plumbers usually install drain boxes in the wall, and then non-plumber tradesman installers (such as those installing appliances like water softeners, washing machines, dishwashers, ice makers, furnaces or HVAC units) typically run pipe/tubing from the installed unit into the already installed drain box, typically a conventional washing machine drain box. When they do so, the plumber loses control of how the discharge water is emptied into the installed drain box. If the non-plumber tradesman puts the pipe/tubing that runs from the appliance through the plumber installed drain box, the pipe/tubing can be installed incorrectly, either crooked or not at the right height to meet the required minimum air gap. If the drain box 12 described above was installed by the plumber rather than a conventional drain box, the discharge pipe 16 is installed in the drain box at the factory, and as a result, the discharge pipe is set at the correct height to provide the required air gap and in vertical alignment with the drain hole 42 in the lower wall 30, which eliminates the variable of incorrect pipe/tubing installation through an aperture in the top wall of a conventional drain box by non-plumber tradesmen which can create extensive splash that projects discharge water out of the drain box, thereby reducing water damage caused by non-plumber tradesmen. Using the above-described drain box and funnel assembly 10, non-plumber tradesmen need simply attach the pipe/tubing from the appliance to the discharge pipe 16, which was already installed at the factory, to the upper end portion 50 of the discharge pipe 16 that projects above the upper wall 32 of the drain box 12, thereby eliminating errors often caused by non-plumber tradesmen.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A drain box for mounting at least in part within a wall in fluid communication with a drain pipe and a discharge fluid conduit carrying discharge water from an appliance, the box comprising:
   a housing including a housing top wall, a housing bottom wall, a housing first side wall and a housing second side wall, a housing back wall and a housing front opening providing access into an interior of the housing defined by the housing top, bottom, first side, second side and back walls;
   a drain aperture in the housing bottom wall;
   a housing upper aperture in the housing top wall;
   a funnel positioned within the interior of the housing, the funnel having a funnel upper side wall and a funnel lower side wall defining an interior funnel chamber, the funnel lower side wall having a lower end portion sized to fit within the drain aperture in the housing bottom wall and a lower end funnel chamber aperture in fluid communication with the drain aperture when the lower end portion of the funnel lower side wall is within the drain aperture, the funnel upper side wall having an upper end funnel chamber aperture, at least a portion of the funnel upper side wall being transparent; and
   a discharge pipe having a lower discharge pipe portion and an upper discharge pipe portion, the lower discharge pipe portion being positioned within the interior of the housing, and the upper discharge pipe portion extending from within the interior of the housing upward through the housing upper aperture and terminating above the housing top wall and sized for connection of the appliance discharge conduit thereto, the lower discharge pipe portion having a lower discharge pipe end with a lower end pipe opening positioned within the funnel chamber with the lower discharge pipe end being positioned above the drain aperture, the lower discharge pipe portion extending upward through the upper end funnel chamber aperture, the discharge pipe being attached to the housing to prevent the lower discharge pipe end from moving downward toward the drain aperture to less than a predetermined minimum distance above the drain aperture.

2. The drain box of claim 1, wherein the funnel is selectively movable up and down along the lower discharge pipe portion prior to the lower end portion of the funnel lower side wall being fitted within the drain aperture in the housing bottom wall.

3. The drain box of claim 1, wherein the transparent portion of the funnel upper side wall is located such that when the lower end portion of the funnel lower side wall is within the drain aperture in the housing bottom wall, the position of the lower discharge pipe end is visible through the transparent portion of the funnel upper side wall.

4. The drain box of claim 1, further including a receptacle extending downward from the housing bottom wall and in fluid communication with the drain aperture, the receptacle having a downward facing opening sized to receive an upper end portion of the drain pipe therein.

5. The drain box of claim 1, wherein the housing further includes a housing front lip extending across the housing front opening and in fluid-tight engagement with the housing bottom wall and the housing first and second side walls.

6. The drain box of claim 1, wherein the funnel further includes a drain opening in the funnel upper side wall positioned such that when the lower end portion of the funnel lower side wall is within the drain aperture in the housing bottom wall, the drain opening is positioned above the housing bottom wall.

7. The drain box of claim 1, wherein the lower discharge pipe portion extends vertically within the interior of the housing.

8. The drain box of claim 7, wherein the lower discharge pipe portion is in vertical alignment with the drain aperture in the housing bottom wall.

9. The drain box of claim 1, wherein funnel upper side wall tapers inward in the upward direction.

10. The drain box of claim 1, wherein the funnel has a perimeter flange projection outward from an exterior surface of the funnel at the junction of the funnel upper side wall and the funnel lower side wall.

11. The drain box of claim 1, wherein the transparent portion of the funnel upper side wall is a viewing window and the area of the funnel upper side wall around the viewing window is not transparent, the viewing window being located such that when the lower end portion of the funnel lower side wall is within the drain aperture in the housing bottom wall, the position of the lower discharge pipe end is visible through the viewing window.

12. The drain box of claim 1, wherein the transparent portion of the funnel upper side wall is a viewing window and at least a portion of the area of the funnel upper side wall below the viewing window is not transparent and defines a lower limit of the viewing window, the lower limit of the viewing window being at or above the predetermined minimum distance above the drain aperture, whereby when the lower end portion of the funnel lower side wall is within the drain aperture in the housing bottom wall, a visual inspection through the viewing window revealing that the lower discharge pipe end is positioned at or above the lower limit, indicates that the lower discharge pipe end is at least at the predetermined minimum distance above the drain aperture, but a visual inspection through the viewing window revealing that the lower discharge pipe end is positioned below the lower limit, indicates that the lower discharge pipe end is below the predetermined minimum distance above the drain aperture.

13. The drain box of claim 1, wherein the lower end portion of the funnel lower side wall, when fit within the drain aperture in the housing bottom wall, extends into the drain pipe, the lower end portion of the funnel lower side wall having a plurality of outwardly projecting crush members sized to engage the drain pipe and flex inward in response.

14. A drain box for fluid communication with a drain pipe and a discharge fluid conduit carrying discharge fluid from an appliance, the box comprising:
a housing including a housing top wall, a housing bottom wall, a housing first side wall and a housing second side wall, a housing back wall and a housing front opening providing access into an interior of the housing defined by the housing top, bottom, first side, second side and back walls;
a drain aperture in the housing bottom wall;
a housing upper aperture in the housing top wall;
a splash containment positioned within the interior of the housing, the splash containment having a splash containment upper wall and a splash containment lower wall, defining together an interior splash containment chamber, the splash containment lower wall having a lower end portion sized to fit within the drain aperture in the housing bottom wall and a first chamber aperture in fluid communication with the drain aperture when the lower end portion of the splash containment lower wall is within the drain aperture, the splash containment upper wall having a second chamber aperture, at least a portion of the splash containment upper wall being transparent; and
a discharge pipe having a lower discharge pipe portion and an upper discharge pipe portion, the lower discharge pipe portion being positioned within the interior of the housing, and the upper discharge pipe portion extending upward through the housing upper aperture and terminating above the housing top wall and sized for connection of the appliance discharge conduit thereto, the lower discharge pipe portion having a lower discharge pipe end with a lower end pipe opening positioned within the splash containment chamber with the lower discharge pipe end being positioned above the drain aperture, the lower discharge pipe portion extending upward through the second chamber aperture, the discharge pipe being attached to the housing to prevent the lower discharge pipe end from moving downward toward the drain aperture to less than a predetermined minimum distance above the drain aperture.

15. The drain box of claim 14, wherein the splash containment is selectively movable up and down along the lower discharge pipe portion prior to the lower end portion of the splash containment lower wall being fitted within the drain aperture in the housing bottom wall.

16. The drain box of claim 14, wherein the transparent portion of the splash containment upper wall is located such that when the lower end portion of the splash containment lower wall is within the drain aperture in the housing bottom wall, the position of the lower discharge pipe end is visible through the transparent portion of the splash containment upper wall.

17. The drain box of claim 14, further including a receptacle extending downward from the housing bottom wall and in fluid communication with the drain aperture, the receptacle having a downward facing opening sized to receive an upper end portion of the drain pipe therein.

18. The drain box of claim 14, wherein the housing further includes a housing front lip extending across the housing front opening and in fluid-tight engagement with the housing bottom wall and the housing first and second side walls.

19. The drain box of claim 14, wherein the splash containment further includes a drain opening in the splash containment upper wall positioned such that when the lower end portion of the splash containment lower wall is within the drain aperture in the housing bottom wall, the drain opening is positioned above the housing bottom wall.

20. The drain box of claim 14, wherein the lower discharge pipe portion extends vertically within the interior of the housing.

21. The drain box of claim 20, wherein the lower discharge pipe portion is in vertical alignment with the drain aperture in the housing bottom wall.

22. The drain box of claim 14, wherein the splash containment has a perimeter flange projection outward from an exterior surface of the splash containment at the junction of the splash containment upper wall and the splash containment lower wall.

23. The drain box of claim 14, wherein the transparent portion of the splash containment upper wall is a viewing window and the area of the splash containment upper wall around the viewing window is not transparent, the viewing window being located such that when the lower end portion of the splash containment lower wall is within the drain aperture in the housing bottom wall, the position of the lower discharge pipe end is visible through the viewing window.

24. The drain box of claim 14, wherein the transparent portion of the splash containment upper wall is a viewing window and at least a portion of the area of the splash containment upper wall below the viewing window is not transparent and defines a lower limit of the viewing window, the lower limit of the viewing window being at or above the predetermined minimum distance above the drain aperture, whereby when the lower end portion of the splash containment lower wall is within the drain aperture in the housing bottom wall, a visual inspection through the viewing window revealing that the lower discharge pipe end is positioned at or above the lower limit, indicates that the lower discharge pipe end is at least at the predetermined minimum distance above the drain aperture, but a visual inspection through the viewing window revealing that the lower discharge pipe end is positioned below the lower limit, indicates that the lower discharge pipe end is below the predetermined minimum distance above the drain aperture.

25. The drain box of claim 14, wherein the lower end portion of the splash containment lower wall, when fit within the drain aperture in the housing bottom wall, extends into the drain pipe, the lower end portion of the splash containment lower wall having a plurality of outwardly projecting crush members sized to engage the drain pipe and flex inward in response.

26. A drain box for fluid communication with a drain pipe and a discharge fluid conduit carrying discharge fluid from an appliance, the box comprising:
a housing having a housing front opening providing access into an interior of the housing, a lower portion with a housing drain aperture, and an upper portion with a housing upper aperture;
a splash containment positioned within the interior of the housing, the splash containment having a splash containment upper portion and a splash containment lower portion, defining together an interior splash containment chamber, the splash containment lower portion having a lower portion sized to fit within the housing drain aperture and a first chamber aperture in fluid communication with the housing drain aperture when the lower portion of the splash containment lower portion is within the housing drain aperture, the splash containment upper portion having a second chamber aperture, at least a portion of the splash containment upper portion being transparent; and a discharge conduit having a lower discharge conduit portion and an upper discharge conduit portion, the lower discharge conduit portion being positioned within the interior of the housing, and the upper discharge conduit portion extending upward through the housing upper aperture and terminating above the housing upper portion and sized for connection of the appliance discharge conduit thereto, the lower discharge conduit portion having a lower discharge conduit end with a lower end conduit opening positioned within the splash containment chamber with the lower discharge conduit end being positioned above the housing drain aperture, the lower discharge conduit portion extending upward through the second chamber aperture, the discharge conduit being attached to the housing to prevent the lower discharge conduit end from moving downward toward the housing drain aperture to less than a predetermined minimum distance above the housing drain aperture.

27. The drain box of claim 26, wherein the splash containment is selectively movable up and down along the lower discharge conduit portion prior to the lower portion of the splash containment lower portion being fitted within the housing drain aperture.

28. The drain box of claim 26, wherein the transparent portion of the splash containment upper portion is located such that when the lower portion of the splash containment lower portion is within the housing drain aperture, the position of the lower discharge conduit end is visible through the transparent portion of the splash containment upper portion.

29. The drain box of claim 26, further including a receptacle extending downward from the housing lower portion and in fluid communication with the housing drain aperture, the receptacle having a downward facing opening sized to receive an upper end portion of the drain pipe therein.

30. The drain box of claim 26, wherein the housing further includes a housing bottom wall and a housing front wall extending upwardly from the housing bottom wall to prevent discharge from exiting the interior of the housing if below an upper end portion of the housing front wall.

31. The drain box of claim 26, wherein the splash containment further includes a drain opening in the splash containment upper portion positioned such that when the lower portion of the splash containment lower portion is within the housing drain aperture, the housing drain opening is positioned to permit discharge fluid within the interior of the housing but exterior to the splash containment chamber, to flow through the drain opening and into the splash containment chamber and then into the housing drain aperture.

32. The drain box of claim 26, wherein the lower discharge conduit portion extends vertically within the interior of the housing.

33. The drain box of claim 32, wherein the lower discharge conduit portion is in vertical alignment with the housing drain aperture.

34. The drain box of claim 26, wherein the splash containment has a perimeter flange projection outward from an exterior surface of the splash containment at the junction of the splash containment upper portion and the splash containment lower portion.

35. The drain box of claim 26, wherein the transparent portion of the splash containment upper portion is a viewing window and the area of the splash containment upper portion around the viewing window is not transparent, the viewing window being located such that when the lower portion of the splash containment lower portion is within the housing drain aperture, the position of the lower discharge conduit end is visible through the viewing window.

36. The drain box of claim 26, wherein the transparent portion of the splash containment upper portion is a viewing window and at least a portion of the area of the splash containment upper portion below the viewing window is not transparent and defines a lower limit of the viewing window, the lower limit of the viewing window being at or above the predetermined minimum distance above the housing drain aperture, whereby when the lower end portion of the splash containment lower portion is within the housing drain aperture, a visual inspection through the viewing window revealing that the lower discharge conduit end is positioned at or above the lower limit, indicates that the lower discharge conduit end is at least at the predetermined minimum distance above the housing drain aperture, but a visual inspection through the viewing window revealing that the lower discharge conduit end is positioned below the lower limit, indicates that the lower discharge conduit end is below the predetermined minimum distance above the housing drain aperture.

37. The drain box of claim 26, wherein the lower portion of the splash containment lower portion, when fit within the housing drain aperture, extends into the housing drain pipe, the lower portion of the splash containment having a plurality of outwardly projecting crush members sized to engage the drain pipe and flex inward in response.

* * * * *